US009137853B2

(12) United States Patent
Lan et al.

(10) Patent No.: US 9,137,853 B2
(45) Date of Patent: Sep. 15, 2015

(54) MULTI-MODE BASE STATION AND METHOD FOR SENDING/RECEIVING SIGNAL THEREOF

(75) Inventors: Peng Lan, Shenzhen (CN); Yingjiu Xia, Shenzhen (CN); Xuewen Yuan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 658 days.

(21) Appl. No.: 13/466,625

(22) Filed: May 8, 2012

(65) Prior Publication Data

US 2012/0220336 A1 Aug. 30, 2012

(30) Foreign Application Priority Data

Nov. 15, 2006 (CN) .......................... 2006 1 0146923

(51) Int. Cl.
 *H04B 1/38* (2015.01)
 *H04B 1/04* (2006.01)
 *H04W 88/10* (2009.01)
(52) U.S. Cl.
 CPC .................................... *H04W 88/10* (2013.01)
(58) Field of Classification Search
 None
 See application file for complete search history.

(56) References Cited

U.S. PATENT DOCUMENTS

| 2002/0177460 | A1 | 11/2002 | Beasley et al. |
| 2004/0190559 | A1* | 9/2004 | Adolfsen et al. ............... 370/503 |
| 2006/0052124 | A1* | 3/2006 | Pottenger et al. ............. 455/515 |
| 2007/0171866 | A1* | 7/2007 | Merz et al. ..................... 370/330 |

FOREIGN PATENT DOCUMENTS

| CN | 1409563 A | 4/2003 |
| CN | 1571299 A | 1/2005 |
| CN | 1571547 A | 1/2005 |

OTHER PUBLICATIONS

Written Opinion of the International Search Authority (translation) dated (mailed) Mar. 6, 2008, issued in related Application No. PCT/CN2007/003228, filed Nov. 15, 2007, Huawei Technologies Co., Ltd.
International Search Report from P.R. China in International Application No. PCT/CN2007/003228 mailed Mar. 6, 2008.

* cited by examiner

*Primary Examiner* — Khalid Shaheed
*Assistant Examiner* — Frank Donado
(74) *Attorney, Agent, or Firm* — Slater & Matsil, L.L.P.

(57) ABSTRACT

A multi-mode base station and a method for sending signals thereof are provided. In the base station, each base-band single-board is connected to a corresponding radio frequency (RF) unit through an exchange bus, and the base-band single-boards of different modes are intermixed by using the compatibility of the exchange bus.

19 Claims, 10 Drawing Sheets

MULTI-MODE BASE STATION AND METHOD FOR SENDING/RECEIVING SIGNAL THEREOF

CROSS-REFERENCE TO RELATED APPLICATIONS

This application is a continuation of U.S. patent application Ser. No. 12/466,731, filed on May 15, 2009, which is a continuation of International Application No. PCT/CN2007/003228, filed on Nov. 15, 2007. The International Application claims priority to Chinese Patent Application No. 200610146923.3, filed on Nov. 15, 2006, all of which are hereby incorporated by reference in their entireties.

BACKGROUND

1. Field of the Invention

The present invention relates to a wireless communication field, and more particularly to a multi-mode base station technology.

2. Background of the Invention

In recent years, communication technologies and especially mobile communication technologies have been developing rapidly, and the first to the third generation (3G) mobile communication systems are emerging successively, so that mobile communication exerts greater and greater impacts on people's work and daily life. Currently, the number of mobile users keeps increasing, and various types of mobile services are also released. For such a steadily growing market, mobile operators worldwide all try to attract and win the users by providing services of new modes rapidly, so as to enhance competitiveness in the market.

At present, base-band single-boards of different modes may be inserted in the same base-band frame of the base station, so as to form a multi-mode base station. The implementation method is to assign fixed slots for different modes in advance. For example, first to fourth slots are assigned to a wideband code division multiple access (WCDMA) mode, and fifth to eighth slots are assigned to a global system for mobile communication (GSM) mode. In different modes, radio frequency (RF) lines through which the base-band single-boards are connected to RF units are of different types. As the mode of each slot is fixed, an RF line from a single-board to an RF unit can be set according to the mode of each slot.

However, the fixed assignment of a slot mode causes new problems. That is, it is difficult to accurately predict proportions of various modes in a base-band frame in the future, thus resulting in that the slots of some modes are insufficient during capacity expansion, while the slots of other modes are unavailable for the capacity expansion of those modes.

SUMMARY

Accordingly, various embodiments of the present disclosure provide a multi-mode base station and a method for sending/receiving signals thereof.

In an embodiment of the present disclosure, a multi-mode base station including at least one radio frequency (RF) unit is provided. The multi-mode base station further includes at least two base-band single-boards and an exchange bus.

The at least two base-band single-boards are of at least two modes.

The exchange bus is configured to connect base-band single-boards to corresponding RF unit(s) in a manner compatible with each mode.

In an embodiment of the present disclosure, a method for sending signals of a multi-mode base station is also provided. The method includes the following steps.

Base-band single-boards of different modes perform base-band processing on downstream data, then generate in-phase/quadrature (IQ) data, and output the IQ data to an exchange bus.

The exchange bus transmits the IQ data from base-band single-boards to a corresponding RF unit in a manner compatible with each mode, and the RF unit sends the data after RF processing.

In an embodiment of the present disclosure, a method for receiving signals of a multi-mode base station is further provided. The method includes the following steps.

An RF processing unit performs RF processing on upstream signals, then generates IQ data of different modes, and outputs the IQ data to an exchange bus.

The exchange bus transmits the IQ data from the RF processing unit to a corresponding base-band single-board in a manner compatible with each mode respectively, and the base-band single-board performs base-band processing on the IQ data.

BRIEF DESCRIPTION OF THE DRAWINGS

The embodiments of the present disclosure will become more fully understood from the detailed description given herein below by referring to the accompanying drawings, in which.

DETAILED DESCRIPTION OF THE EMBODIMENTS

In order to make the objectives, technical solutions, and advantages of the present invention comprehensible, embodiments accompanied with figures are described in detail below.

Figure 1:
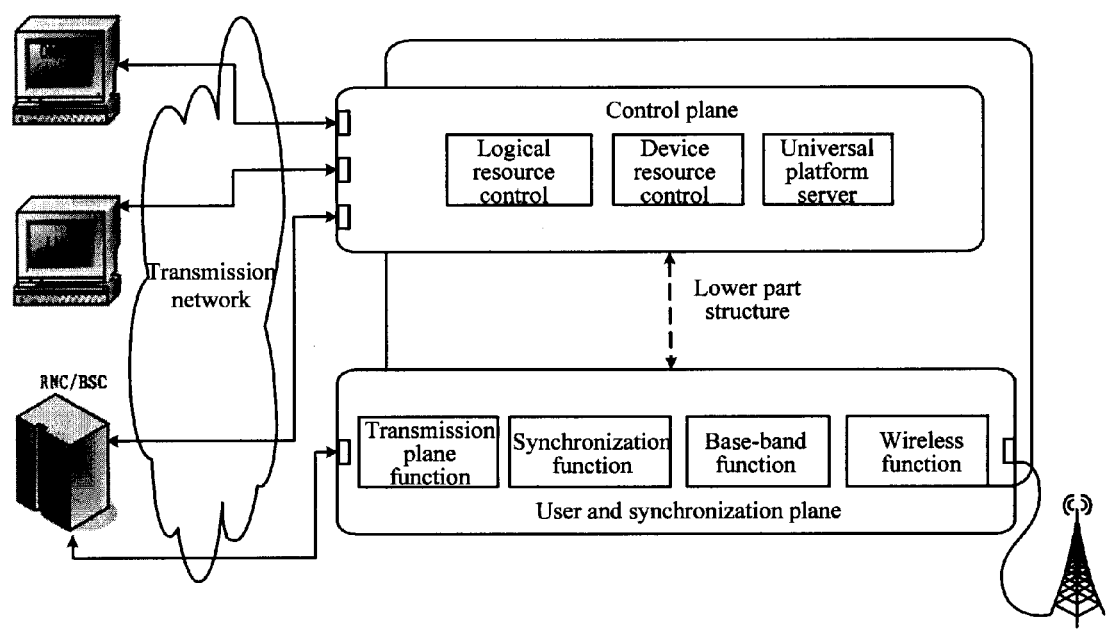
FIG. 1 is a schematic view of a logical architecture of a multi-mode base station according to an embodiment of the present disclosure.

In each embodiment of the present disclosure, a logical architecture of a base station substantially stays the same. As shown in FIG. 1, the logical architecture may be divided into a control plane and a user and synchronization plane. The control plane is adapted to realize functions of a logical resource control, a device resource control, and a universal platform server. The user and synchronization plane is adapted to realize a transmission plane function, a synchronization function, a base-band function, and a wireless function. The key point is that, when the base-band function is implemented in the base station, base-band single-boards (BBP) are connected to corresponding RF units through exchange buses, and the base-band single-boards of different modes are intermixed by using the compatibility of the exchange bus with IQ data of various modes, so as to form a multi-mode base station. Mixed insertion indicates that a base-band single-board of each single mode can be inserted in a random slot.

Figure 2:
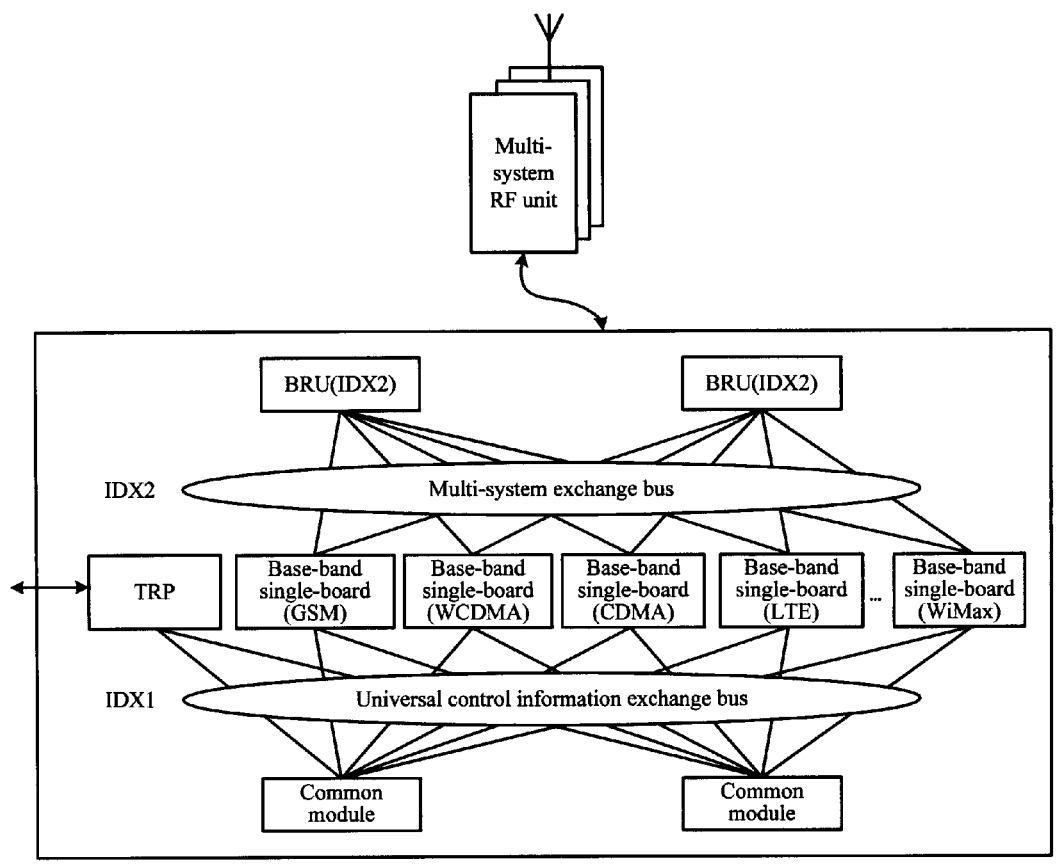
FIG. 2 is a schematic structural view of a multi-mode base station according to an embodiment of the present disclosure.

A first embodiment of the present disclosure is illustrated below. Referring to FIG. 2, in this embodiment, a multi-mode base station includes at least one RF unit, a plurality of base-band single-boards of at least two modes, and an exchange bus (IDX2). The exchange bus is configured to connect each base-band single-board to an RF unit in a manner compatible with each of the above modes.

The modes of the base-band single-boards include at least two of a global system for mobile communication (GSM) mode, a code division multiple access (CDMA) mode, a worldwide interoperability for microwave access (WiMAX) mode, a WCDMA mode, a time division synchronous code division multiple access (TD-SCDMA) mode, a code division multiple access 2000 (CDMA2000) mode, a personal handyphone system (PHS) mode, a cluster mode, a long term evolution (LTE) mode, an air-interface evolution mode, and the like.

When each base-band single-board of the base station processes various services, a clock synchronization signal is usually needed to serve as a reference. The clock synchronization signal includes a system clock, a frame timing period signal, and a base transceiver station frame number (BFN), and may further include time information. The system clock usually serves as a clock reference source when each base-band single-board processes services. The frame timing period signal is usually configured to indicate a frame period. The frame number is usually configured to locate specific service data. The frame timing period signal together with the frame number is configured to indicate a location of specific service data. In the multi-mode base station, the base-band single-boards of different modes may adopt the same system clock, but the frame timing period signals of these base-band single-boards are different from each other. For example, a GSM frame timing period is 4.615 milliseconds (that is, 60/13 milliseconds), while a WCDMA frame timing period is 10 milliseconds. Similarly, the frame numbers of the base-band single-boards of different modes may also have different digits. For example, the frame number of WCDMA has 12 digits, while the frame number of GSM has 22 digits. In addition, modes such as CDMA2000 and TD-SCDMA also need time information such as GPS time to realize synchronization between various base stations in a network. Thus, in a design where clock synchronization signals of the multi-mode base station that supports these modes are transmitted, the time information also needs to be transmitted to the base-band single-boards of these modes. Thereby, the multi-mode base station according to the embodiment of the present disclosure also includes a common module, which is configured to uniformly provide clock signals to base-band single-boards. The common module is connected to the base-band single-board(s) of different modes in the same multi-mode base station through a clock bus. Base-band single-boards of different modes recover the clock synchronization signal required by the corresponding mode from a system clock and a synchronization burst transmitted from the clock bus.

A detailed description is given below by taking the multi-mode base station including two base-band single-boards of GSM and WCDMA respectively.

The synchronization burst means that related synchronization clock information is transmitted in the form of a burst, and the burst is periodic. Here, in consideration of the fact that the WCDMA frame timing period is 10 milliseconds, and also to facilitate the processing, the burst period is set as 10 milliseconds. Of course, the burst period may also be set in other lengths, for example, 20 milliseconds. In such a synchronization burst, frame numbers, time information, and the like required by each mode are provided in a fixed format. Specifically, referring to Table 1, a frame format of the burst is shown, where the unit in Table 1 is a bit.

TABLE 1

| Start Bit | Mode Number | Type | | Frame Number | CRC | End Bit |
|---|---|---|---|---|---|---|
| | | | Mode is valid or not? | | | |
| 1 | 8 | 8 | 1 | 63 | 16 | |
| | | | Mode is valid or not? | | | |
| | | 8 | 1 | 63 | 16 | |
| | | | Time Information | | | |
| | | 8 | 64 | | 16 | 1 |

As shown in Table 1, a first column and a last column in Table 1 are respectively the start bit and the end bit of the burst. Both of the start bit and the end bit occupy 1 bit. The start bit may be at a high level "1", and the end bit may be at a low level "0".

A second column in Table 1 is a mode number, which occupies 8 bits. A value of the mode number stands for the number of the modes supported by the multi-mode base station. In this embodiment, the multi-mode base station includes two base-band single-boards of two modes GSM and WCDMA. Thus, the number of the modes is 2, which is a dual-mode base station.

The four entries from Type to Cyclic redundancy check (CRC) in Table 1 are 88 bits in total, which is a group serving as a multi-frame of a mode. The multi-frame indicates synchronization information content of one mode. In this embodiment, such a group serves as a multi-frame of WCDMA. In the 88 bits, the first 8 bits indicates Type, which stands for a mode type. For example, 01 h is adapted to stand for a WCDMA FDD (R6) mode. The middle 64 bits indicates a content of the type. Among the 64 bits, the first bit indicates whether the mode is valid or not in the 10 millisecond burst period, where the mode is valid by setting the first bit to 1 and invalid by setting the first bit to 0, and the other 63 bits indicate the frame number of the mode. As the frame number of WCDMA has 12 digits, the 63 bits that indicate a frame number is sufficient to denote the frame number of WCDMA. The last 16 bits of every group is a check value of CRC for the previous 72 bits in the group. The following four entries with 88 bits in total form a second group. The second group is almost the same as the first group of 88 bits, only serving as a multi-frame of another mode. The multi-frame of the second group stands for information about another mode, i.e., the information about the GSM mode in this embodiment.

In Table 1, a last group of 88 bits is further provided, which serves as a time information frame and stands for time of day (TOD). The TOD indicates timing information such as a GPS absolute time required by modes of CDMA2000 and the like. The type is denoted by 70 h. A detailed definition of the time information is shown in Table 2.

TABLE 2

Time Information

| Valid or Not? | Idle | TOD Detailed Content | Jump Second | GPS Time |
|---|---|---|---|---|
| 0 | 15 bits | 01 h | 8 bits | 32 bits |

In this embodiment, as the base station is a dual-mode base station supporting GSM and WCDMA, and the GSM and WCDMA do not need time synchronization, the GPS time is not required. Thus, the entry "Valid or Not" in this group is set to 0, indicating that the time information is invalid. When the base station supports modes such as CDMA2000 that require the GSP time, the corresponding entry may be set to 1, indicating that the time information is valid. The next 15 bits are idle. In TOD Detailed Content, 8 bits of 01 h are configured to indicate that the GPS time is transmitted. The 8 bits of Jump Second indicate a time difference between a current GPS time and a universal time coordinated (UTC). The UTC is a universal standard time, i.e., the Greenwich Mean Time (GMT). In the GPS time, 32 bits are configured to indicate the length of the GPS time starting from Jan. 6, 1980. Therefore, the burst contains the TOD information shown in Table 2, and thus the multi-mode base station supports the mode that requires a GPS time.

In Table 1, in the case of the dual-mode base station, only the frame format of the synchronization burst is provided. When the multi-mode base station supports more than two modes, through software configuration according to the frame format of the burst shown in Table 1, only a corresponding entry indicating a mode needs to be added in front of the last group that indicates the time information. Similarly, the entry indicating the mode may also be deleted, so as to fulfill the demand of the single-mode base station.

Figure 3:
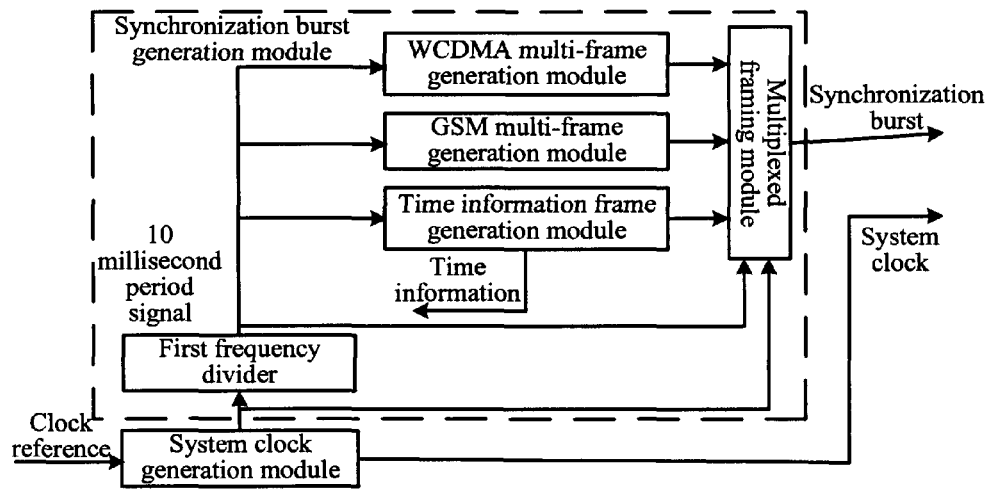
FIG. 3 is a block diagram of a device for transmitting a clock synchronization signal in a multi-mode base station according to an embodiment of the present disclosure.

A common module for transmitting clock synchronization signals in the multi-mode base station is illustrated with reference to FIG. 3. As shown in FIG. 3, the common module for transmitting clock synchronization signals includes a synchronization burst generation module and a system clock generation module. A system clock in the clock synchronization signal of the multi-mode base station is generated by the system clock generation module. Synchronization information, such as frame numbers and time information corresponding to various modes in the clock synchronization signal, is uniformly generated by the synchronization burst generation module.

The system clock generation module is configured to generate a system clock required by a dual-mode base station according to an input clock reference. One path of the system clock, together with the synchronization burst generated by the synchronization burst generation module, serves as a clock synchronization signal, which is input to each base-band single-board through the same clock bus, and another path thereof is input to the synchronization burst generation module. As the system clock is a clock reference when the base-band single-board processes services, the base-band single-board also needs to recover a working clock from the system clock when working. Therefore, the same system clock is adopted herein for the base-band single-boards of various modes. A system clock generated by the system clock generation module is input to the base-band single-boards of various modes through the same clock bus. A working clock required by the base-band single-board itself is recovered by the base-band single-board through processing with a phase-locked loop. The system clock generation module is implemented with the cooperation of various software and hardware mechanisms (such as, a phase-locked loop, a phase detection module, and a filtering software) for generating a system clock in the prior art. The input clock reference may be a clock reference source input from outside the base station, for example, a clock reference source output by a radio network controller (RNC). In a mode that requires a GPS time, the GPS time may also serve as a clock reference source.

The synchronization burst generation module is configured to generate a synchronization burst carrying synchronization information about the mode supported by the base station according to the system clock generated by the system clock generation module. The synchronization burst together with the system clock is input to each base-band single-board through the same clock bus. In this embodiment, the synchronization burst generation module includes a first frequency divider, a WCDMA multi-frame generation module, a GSM multi-frame generation module, a time information frame generation module, and a multiplexed framing module.

The first frequency divider is configured to perform frequency division on the system clock generated by the system clock generation module to obtain a synchronization burst period, for example, a 10 millisecond period herein. In addition to being used as a reference for sending the synchronization burst, the synchronization burst period also serves as references for various multi-frame periods in a multi-frame generation module and a reference for determining whether various modes are valid or not.

The multi-frame generation module is configured to generate and output multi-frames carrying various mode synchronization information according to the synchronization burst period generated by the first frequency divider. In this embodiment, the multi-frame generation module is a WCDMA multi-frame generation module or a GSM multi-frame generation module.

Figure 4:
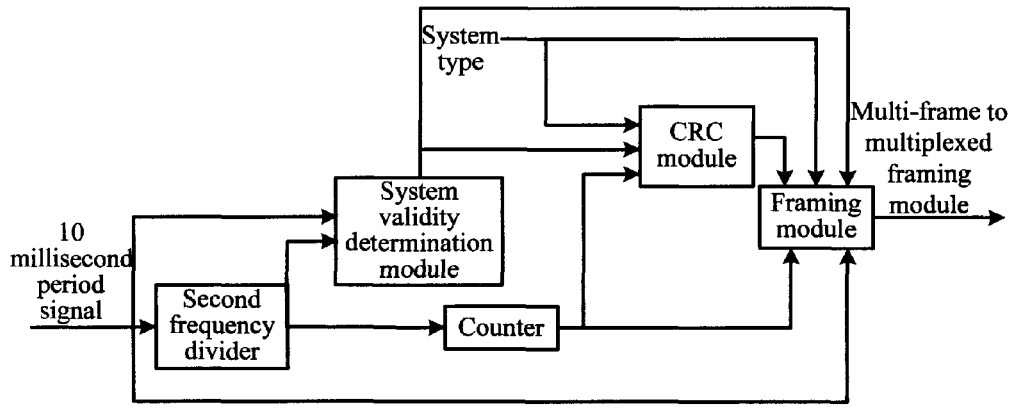
FIG. 4 is a block diagram of a multi-frame generation module of a synchronization burst generation module in a multi-mode base station according to an embodiment of the present disclosure.

The multi-frame generation module is described below with reference to FIG. 4. The multi-frame generation module shown in FIG. 4 includes a second frequency divider, a mode validity determination module, a counter, a CRC module, and a framing module.

The second frequency divider is configured to generate a multi-frame period signal according to a period signal of the synchronization burst. For the WCDMA multi-frame generation module, as the WCDMA frame timing period is 10 milliseconds, a synchronization burst period is 10 milliseconds. In the synchronization burst period, the WCDMA is always valid. Thus, a WCDMA multi-frame period is also 10 milliseconds. The second frequency divider is configured to generate a 10 millisecond WCDMA multi-frame period. For the GSM multi-frame generation module, a GSM frame timing period is 60/13 milliseconds. A synchronization burst period is 10 milliseconds. The GSM becomes valid at the sixth synchronization burst period, and therefore a GSM multi-frame period is 60 milliseconds, i.e., a minimal common multiple of its own frame timing period and a synchronization burst period. The second frequency divider is configured to generate a GSM multi-frame period of 60 milliseconds. The multi-frame period signals divided by the second frequency divider are output to the mode validity determination module and the counter respectively.

The mode validity determination module is configured to determine whether the mode intending to generate a multi-frame is valid or not according to a period signal of the synchronization burst and a multi-frame period signal, and output a determination result to the CRC module and the framing module. For the WCDMA multi-frame generation module, the synchronization burst period and the WCDMA multi-frame period are equal, so that the WCDMA mode is always valid in each synchronization burst period, and the determination result is always 1. For the GSM multi-frame generation module, every six synchronization burst periods is equal to the GSM multi-frame period, so that the GSM mode is valid once in every six synchronization burst periods, and when the GSM mode is invalid, the determination result is set as 0.

The counter is configured to generate a frame number by counting the multi-frame periods. The frame number generated by the counter is output to the CRC module and the framing module respectively. For the WCDMA multi-frame generation module, the multi-frame period and its own frame timing period are equal. The counter increases the number by 1 until the number reaches a digit number of the WCDMA frame number, that is, every time a multi-frame period signal is input to the counter, the counter adds 1 and outputs the number as a frame number. When reaching the digit number of the WCDMA frame number, the cycle is then repeated. For the GSM multi-frame generation module, one multi-frame period, i.e., 60 milliseconds, is 13 frame timing periods of its own, that is, each frame timing period is 60/13 milliseconds. Therefore, the counter increases by 13 till reaching a digit number of the GSM frame number. In other words, every time a GSM multi-frame period signal is input to the counter, the counter adds 13 and outputs the number as a frame number. When reaching the digit number of the GSM frame number, the cycle is repeated.

The CRC module is configured to perform CRC on the mode type, mode validity and frame number, and then output a check value to the framing module. The mode validity and the frame number are output from the mode validity determination module and the counter respectively. The mode type is pre-configured according to a design of the multi-mode base station. As it is already known that the WCDMA and GSM modes are required to be supported during the transmission of the clock synchronization signals of a dual-mode base station, when a multi-frame needs to be formed, the pre-configured 01 h and 04 h that respectively stand for a WCDMA mode and a GSM mode are input to the CRC module and the framing module.

The framing module is configured to arrange a mode type, a result output by the mode validity determination module, a frame number output by the counter, and a check value output by the CRC module, form a multi-frame in a format as shown in Table 1, and output the multi-frame to the multiplexed framing module according to the 10 millisecond period signal.

In a mode that needs time information (for example, CDMA2000), the support of GPS is further required. In this situation, a time information frame is generated by the time information frame generation module. The time information frame generation module is configured to generate a time information frame in a format as shown in Tables 1 and 2 according to a synchronization burst period and GPS time information. In this situation, the GPS may serve as a clock reference source of the base station.

The multi-frames of the corresponding modes generated by the multi-frame generation modules of various modes are input to the multiplexed framing module. As the start bit and the end bit of the synchronization burst are fixed, and the modes that the multi-mode base station supports are already known in advance, when the multi-mode base station is designed, the number of the modes may also be pre-configured. The multiplexed framing module is adapted to arrange the input multi-frame, the fixed start bit and end bit, and the pre-configured mode number, so as to form a synchronization burst as shown in Table 1. In a mode that requires the time information, the multiplexed framing module is further adapted to multiplex the multi-frame and the time information frame generated by the time information frame generation module, so as to generate a synchronization burst.

Figure 5:
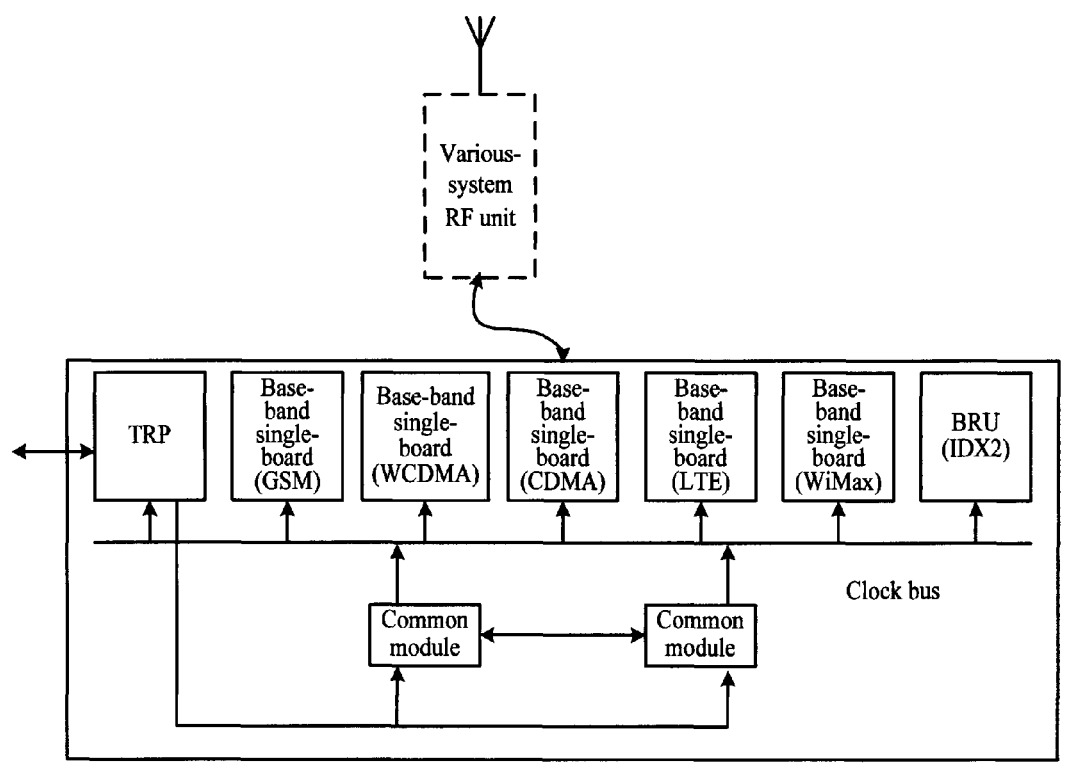
FIG. 5 is a schematic view of a multi-mode universal clock bus in a multi-mode base station according to an embodiment of the present disclosure.

The synchronization burst generated by the synchronization burst generation module and the system clock generated by the system clock generation module are input to each base-band single-board through the same clock bus. The base-band single-board may select synchronization information that belongs to its own mode, such as a frame number from the synchronization burst, according to the mode type, and recover a working clock from the system clock by using a phase-locked loop or the like. Thus, in this embodiment, the base-band single-boards share the same clock bus. In comparison with the prior art, cables and interface devices on each base-band single-board are reduced, so that the device cost is lowered. In this embodiment, the GSM and WCDMA dual-mode base stations are mainly described. When the base station includes more than two base-band single-boards of different modes, the same clock bus may still be shared, as shown in FIG. 5.

As shown in FIG. 2, the multi-mode base station also includes another common module configured to provide a main control function and/or a transmission function for base-band single-boards. The base-band single-boards in the same base station are directly or indirectly connected to the another common module, so as to share the main control function and/or the transmission function provided by the another common module. Compared with the prior art in which each base-band single-board employs its own main control and transmission, a plurality of base-band single-boards may share a set of components to provide main control and/or transmission in embodiments of the present disclosure, so as to lower the cost. Through sharing, newly added base-band single-boards no longer need separated main control and transmission components during the expansion of the base station, thereby reducing the expansion cost. Referring to FIG. 2, each base-band single-board is connected to another common module through one universal control information exchange bus (IDX1). In embodiments of the present disclosure, a same common module is configured to provide main control, transmission, or a clock signal for the base-band single-boards. In FIG. 2, two common modules in an active/standby relation are provided to enhance the entire reliability of the system.

The exchange bus is only one of the manners for connecting the base-band single-board to the common module. Some available connection manners are listed as follows.

Figure 6:
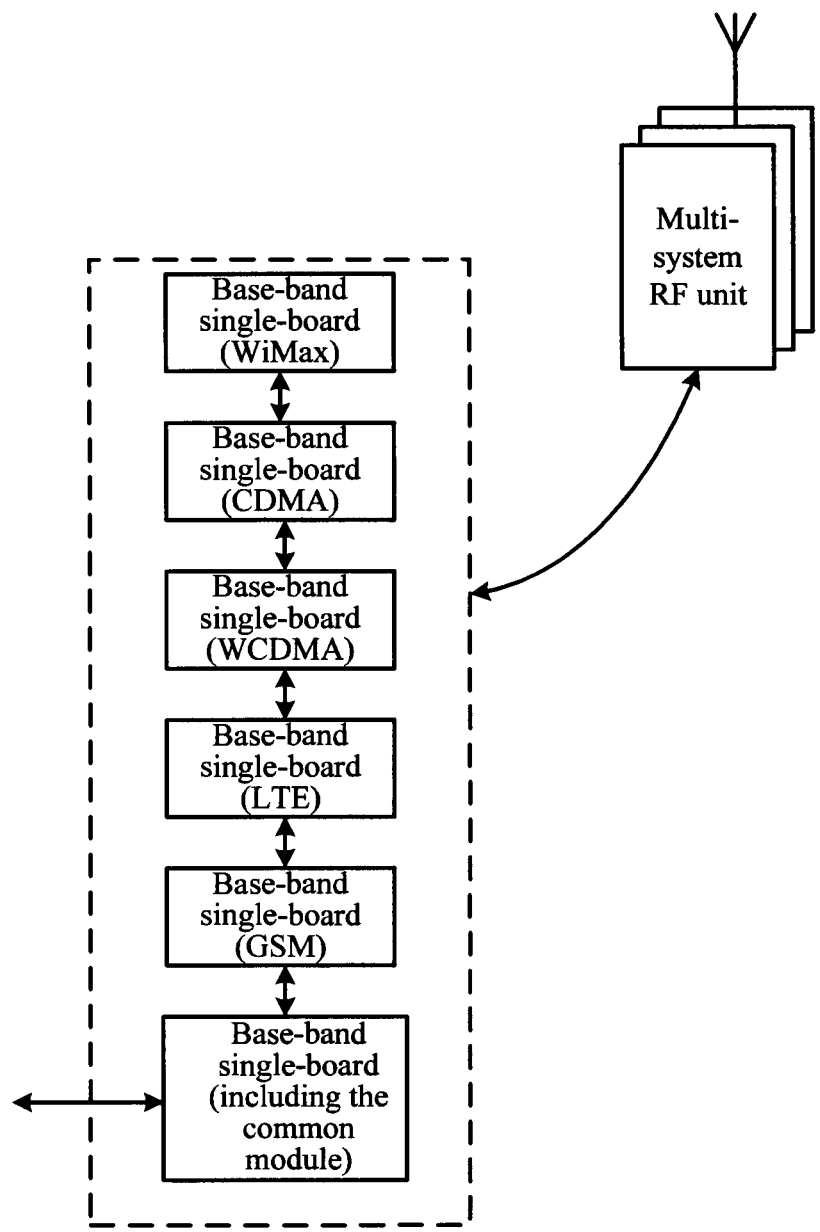
FIG. 6 is a schematic view of a chain-type interconnection between base-band single-boards and a common module in a multi-mode base station according to an embodiment of the present disclosure.

A chain-type interconnection: the common module is at one end of the chain, and the base-band single-boards are serially-connected on one chain, as shown in FIG. 6.

Figure 7:
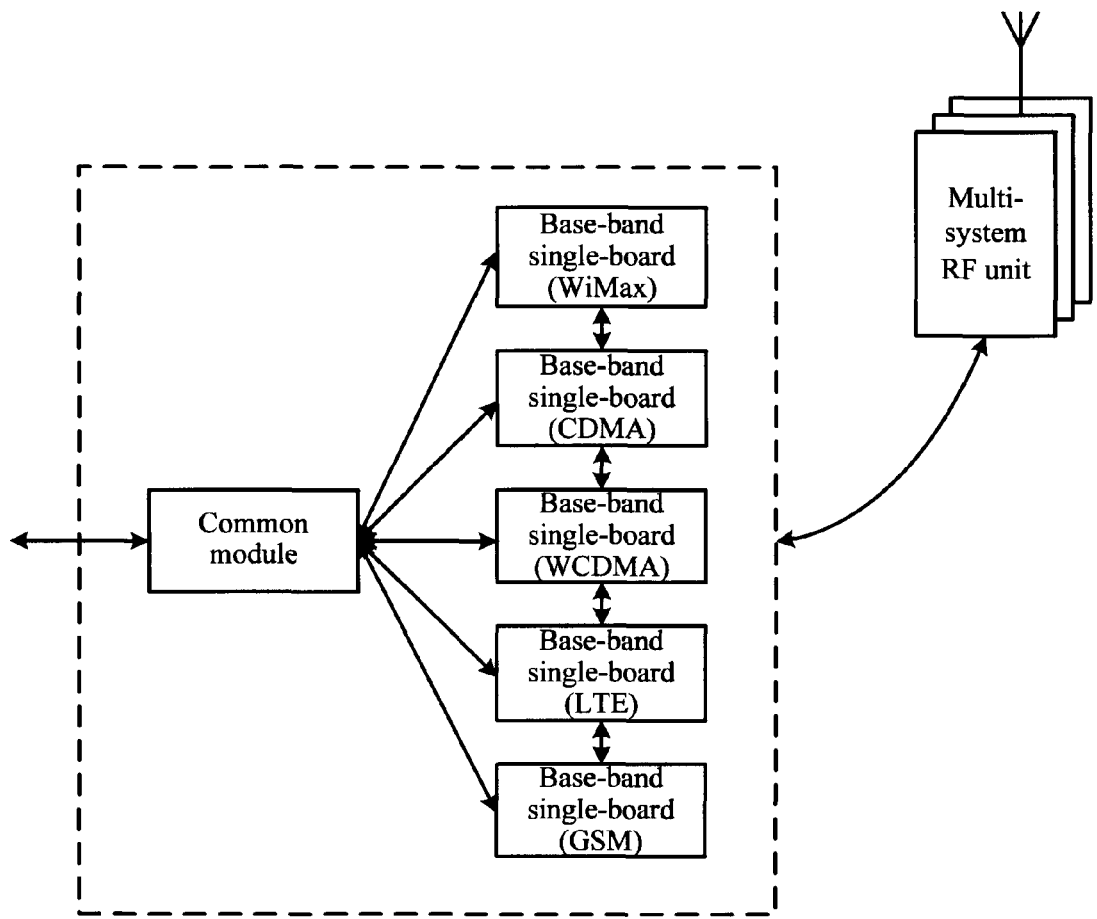
FIG. 7 is a schematic view of a star-type interconnection between the base-band single-board and the common module in the multi-mode base station according to an embodiment of the present disclosure.

A star-type interconnection: the common module is at a central position and is respectively connected to the base-band single-boards, as shown in FIG. 7.

Figure 8:
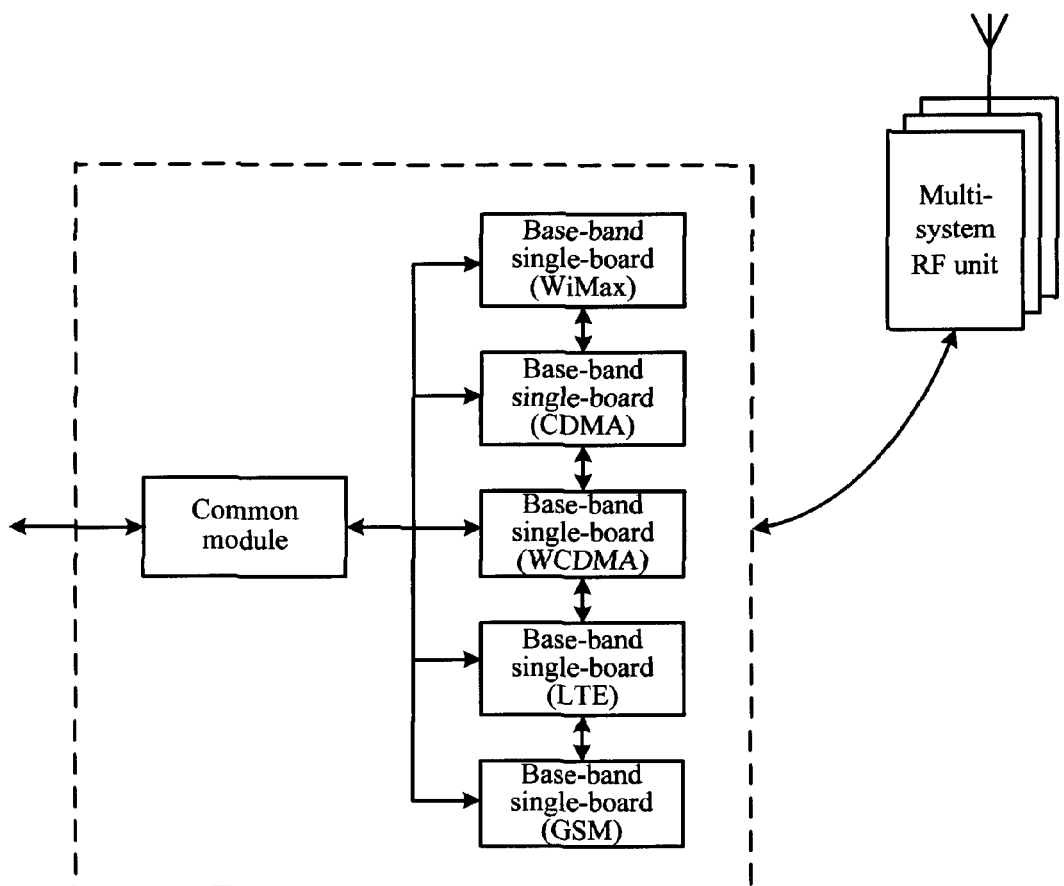
FIG. 8 is a schematic view of a bus-type interconnection between the base-band single-board and the common module in the multi-mode base station according to an embodiment of the present disclosure.

A bus-type interconnection: the common module and each base-band single-board are respectively connected to the same bus, as shown in FIG. 8.

Figure 9:
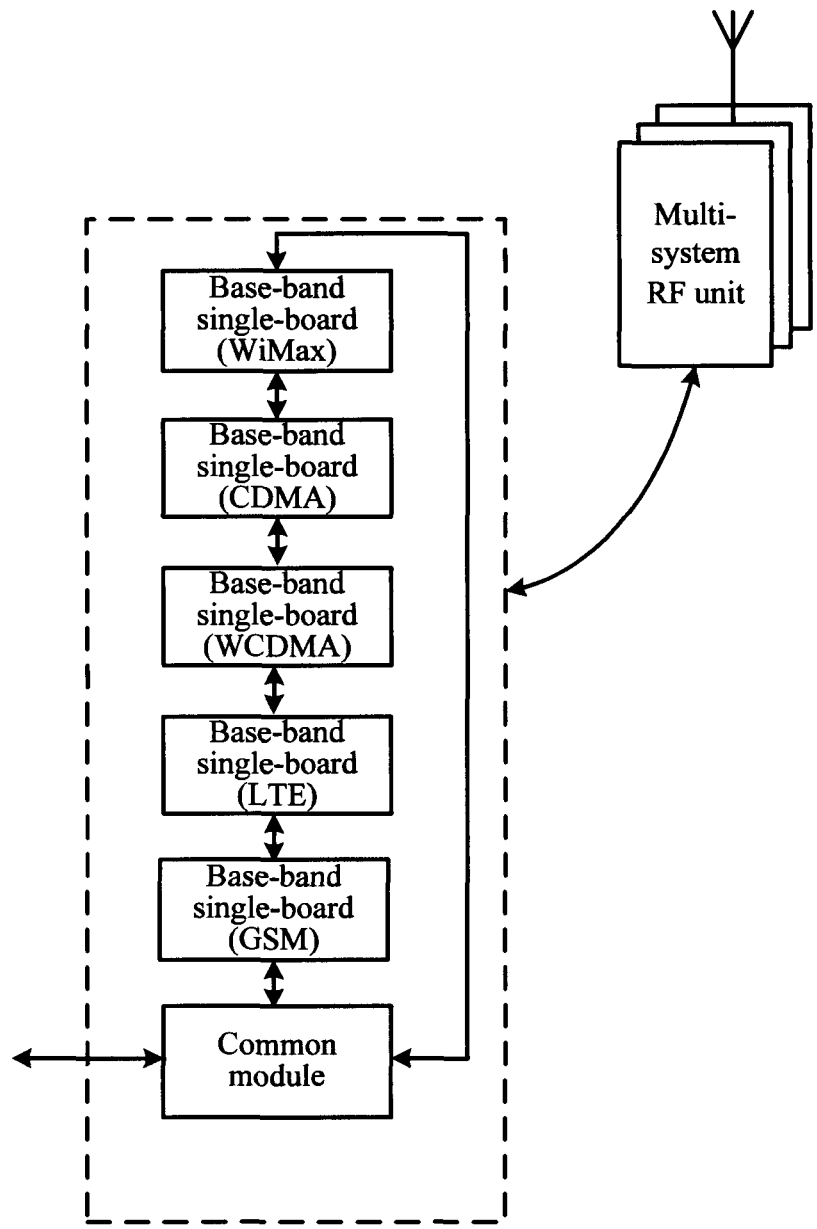
FIG. 9 is a schematic view of a ring-type interconnection between the base-band single-board and the common module in the multi-mode base station according to an embodiment of the present disclosure.

A ring-type interconnection: the common module and each base-band single-board are respectively serially-connected at the same ring, as shown in FIG. 9.

Figure 10:
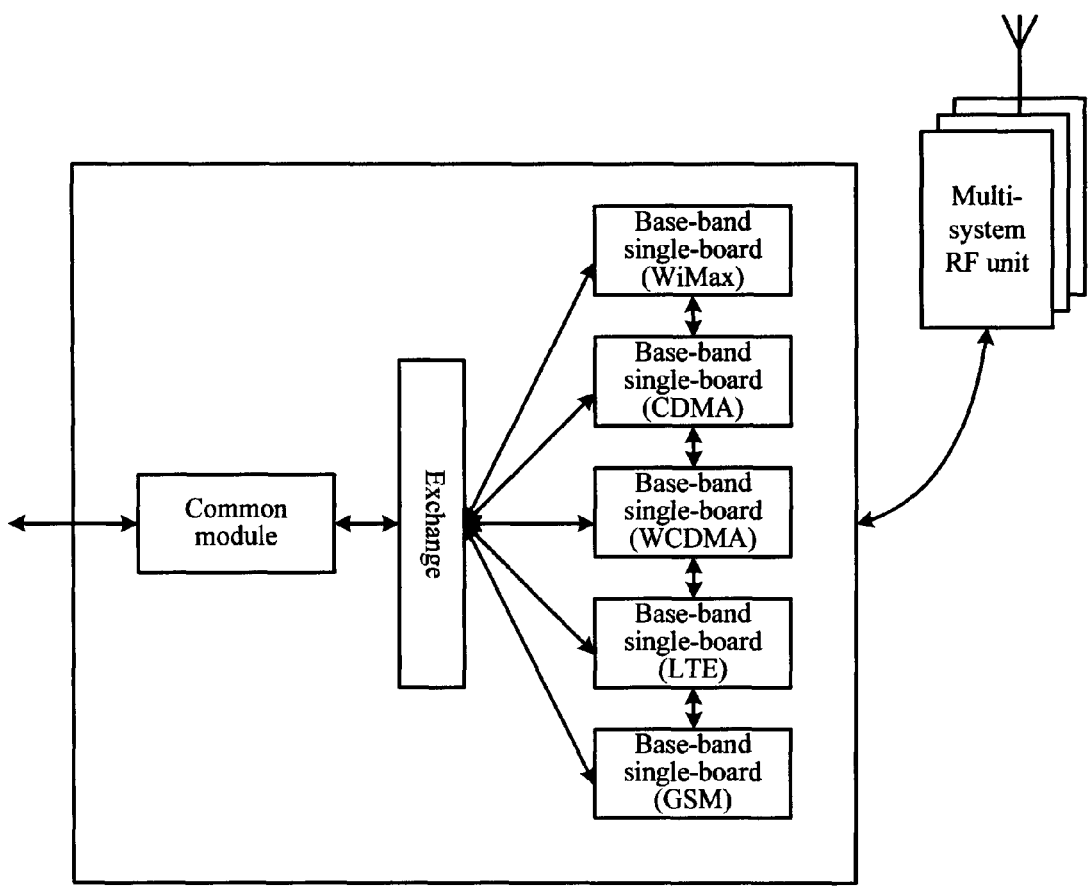
FIG. 10 is a schematic view of an exchange-type interconnection between the base-band single-board and the common module in the multi-mode base station according to an embodiment of the present disclosure.

An exchange-type interconnection: the common module and each base-band single-board are respectively connected to the same exchanger, as shown in FIG. 10.

As the common module and each base-band unit may be interconnected in various manners such as a chain-type, a star-type, a bus-type, a ring-type, and an exchange-type, the flexibility in practical configuration of a base station is enhanced.

Further, in this embodiment, the exchange bus is compatible with various modes in the following manners.

The exchange bus uses a basic frame group as a unit to carry IQ data. Each basic frame group includes N basic frames. A period of each basic frame group is M times as long as a service data mode period of the radio equipment (i.e., the base-band single-board and RF unit). The base-band single-board and RF unit fills the IQ data of the M service data mode periods in one basic frame group for transmission. N and M are natural numbers. The base-band single-board and RF unit includes a base-band single-board and an RF unit.

In an embodiment of common-multiple relation mapping, the filling and synchronization of wireless IQ data of a plurality of different modes are realized, so that a universal interface is applicable to a plurality of mode types, thereby enhancing the interface compatibility, improving the flexibility of wireless transmission, and simplifying the transmission mechanism of wireless interfaces.

As the IQ data of different rates is required to be carried at the same rate in order to ensure that a processing time delay does not change greatly, the IQ filling needs to be as uniform as possible, so that each basic frame in the basic frame group should be aligned with the IQ data of the service frames that carry every wireless service of each base-band single-board and RF unit. In order to achieve this effect, the IQ data of M service data mode periods is filled in one basic frame group for transmission according to one of the following rules.

Each base-band single-board and RF unit is assigned with a K-bit bearing space in a load region of every basic frame in the basic frame group, and K=[M×2×D×S×A×C×F/N]. A is the number of antennae in the base-band single-board and RF unit. C is the number of carriers in the base-band single-board and RF unit. S is an over-sampling multiple of the interface IQ data. D is a bit width of the I/Q data. F is the number of sectors supported by the base-band single-board and RF unit. The brackets, denoted by "[ ]", indicate a round up operation.

Alternatively, when the bearing space assigned in the basic frame group is greater than a bearing space actually required by the service frame IQ data, a bearing space in the basic frame with a posterior transmission sequence in the basic frame group is filled preferentially, so that all the bearing spaces of the basic frames at the posterior part of the transmission sequence are filled, and an equal amount of data is filled in the rest of the basic frames in the basic frame group.

Alternatively, when the bearing space assigned in the basic frame group is greater than the bearing space actually required by the service frame IQ data, a bearing space in the basic frame with a posterior transmission sequence in the basic frame group is filled preferentially, so that all the bearing spaces of the basic frames at the posterior part of the transmission sequence are filled, the bearing spaces of the basic frames at the prior part of the transmission sequence in the basic frame group are not filled, and the one or zero basic frame in the middle is partially filled with data. Alternatively, when the bearing space assigned in the basic frame group is greater than the bearing space actually required by the service frame IQ data, a bearing space in the basic frame with a prior transmission sequence in the basic frame group is filled preferentially, so that all the bearing spaces of the basic frames at the prior part of the transmission sequence are filled, and an equal amount of data is filled in the rest of the basic frames in the basic frame group.

Alternatively, when the bearing space assigned in the basic frame group is greater than the bearing space actually required by the service frame IQ data, a bearing space in the basic frame with a prior transmission sequence in the basic frame group is filled preferentially, so that all the bearing spaces of the basic frames at the prior part of the transmission sequence are filled, the bearing spaces of the basic frames at the posterior part of the transmission sequence in the basic frame group are not filled, and the one or zero basic frame in the middle is partially filled with data.

Figure 11:
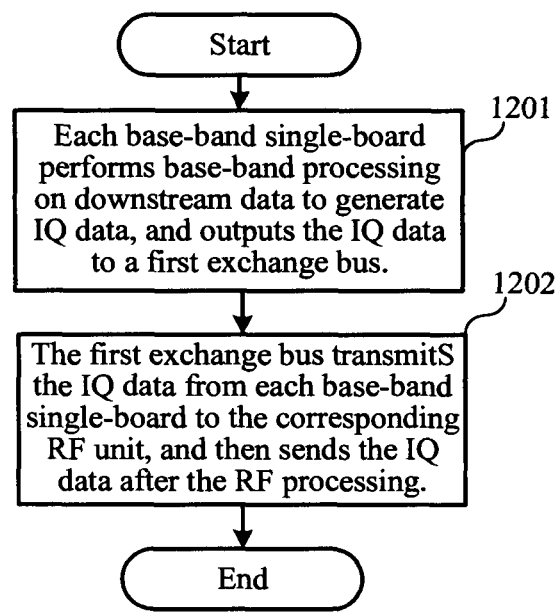
FIG. 11 is a flow chart of a method for sending signals of a multi-mode base station according to an embodiment of the present disclosure.

In another embodiment of the present disclosure, a sending method of a multi-mode base station is provided. As shown in FIG. 11, in Step 1201, base-band single-boards of different modes perform base-band processing on downstream data to generate IQ data, and then output the IQ data to an exchange bus. Further, each base-band single-board is connected to a corresponding RF unit through the exchange bus, and mixed insertion of the base-band single-boards of different systems in the same base station is realized by using the compatibility of the exchange bus with IQ data of various modes. In addition, each base-band single-board obtains a clock signal according to the same clock bus, and performs base-band processing according to the clock signal.

In Step 1202, the exchange bus transmits the IQ data from each base-band single-board to the corresponding RF unit in a manner of being compatible with various modes, and the IQ data is sent after the RF processing.

Figure 12:
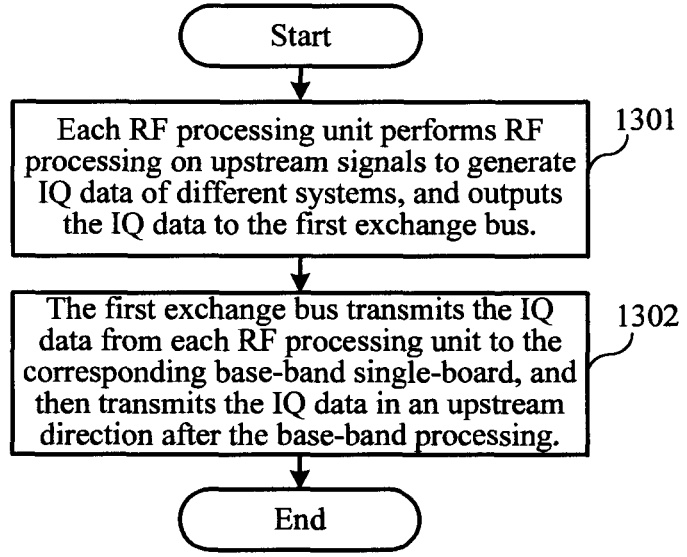
FIG. 12 is a flow chart of a method for receiving signals of a multi-mode base station according to an embodiment of the present disclosure.

In yet another embodiment of the present disclosure, a receiving method of a multi-mode base station is provided, as shown in FIG. 12.

In Step 1301, each RF processing unit performs RF processing on upstream signals to generate IQ data of different modes, and then outputs the IQ data to an exchange bus.

In Step 1302, the exchange bus transmits the IQ data from each RF processing unit to the corresponding base-band single-board in a manner compatible with various modes for base-band processing, and then transmits the IQ data in an upstream direction. Each base-band single-board obtains a clock signal according to the same clock bus, and performs base-band processing according to the clock signal.

As can be seen from the specific implementations provided in the above embodiments of the present disclosure, each base-band single-board is connected to a corresponding RF unit through an exchange bus, and the base-band single-boards of different modes are intermixed by using the compatibility of the exchange bus with IQ data of various modes, so that slot resources in a base-band frame are fully utilized.

Further, as can be seen from the specific implementations provided in the above embodiments of the present disclosure, synchronization information, such as a frame number required by various modes, forms a synchronization burst through multiplexed framing, and the same system clock is adopted, so that the synchronization burst and the system clock can be transmitted to the base-band single-boards of various modes through a set of synchronization clock buses, thereby reducing the cables on a backplane and also lowering the cost.

As can be seen from the specific implementations provided in the above embodiments of the present disclosure, main control and transmission functions are uniformly provided for each base-band single-board inside a base station through a shared common module. Thereby, a plurality of base-band single-boards may share a set of components to provide main control and transmission functions, so as to reduce the cost. Through sharing, newly added base-band single-boards no longer need separated main control and transmission components during the expansion of the base station, thereby lowering the expansion cost.

As can be seen from the specific implementations provided in the above embodiments of the present disclosure, the shared common module and each base-band single-board may be interconnected in various manners such as a chain-type, a star-type, a bus-type, a ring-type, and an exchange-type, so as to enhance the flexibility that the base station is practically configured.

As can be seen from the specific implementations provided in the above embodiments of the present disclosure, the filling and synchronization of wireless IQ data of a plurality of different modes are realized in a manner of common-multiple relation mapping, so that a universal interface is applicable to a plurality of mode types, thereby enhancing the interface compatibility, improving the flexibility of wireless transmission, and simplifying the transmission mechanism of wireless interfaces.

Moreover, as can be seen from the specific implementations provided in the above embodiments of the present disclosure, the transmission of service data of a plurality of different modes is realized in a manner of fixed mapping of the IQ data of different base-band single-board and RF units or different mode wireless services at RF interface basic frames. By making the mapping of the IQ data as uniform as possible, the data rate is uniformly transmitted, thus ensuring that the system has a preferable delay performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-mode base station comprising at least one radio frequency (RF) unit, and further comprising:
   at least two base-band single-boards of at least two modes; and an exchange bus, configured to connect each of the at least two base-band single-boards of different modes to a corresponding RF unit of the at least one RF unit in a manner compatible with each of the modes; and
   a common module configured to provide at least one of a main control signal or transmission for the at least two base-band single-boards,
   wherein the exchange bus is compatible with each of the multi modes in the following manner:
   the exchange bus carries in-phase/quadrature (IQ) data by using a basic frame group as a unit, each basic frame group comprises N basic frames, and a period of each basic frame group is M times as long as a service data mode period; and
   a radio equipment fills the IQ data of M service data mode periods in one basic frame group for transmission, wherein N and M are natural numbers.

2. The multi-mode base station according to claim 1, wherein the common module and the base-band single-boards are connected in a direct or indirect manner.

3. The multi-mode base station according to claim 1, wherein the common module is configured to further provide a clock signal for the base-band single-boards through a clock bus.

4. The multi-mode base station according to claim 3, wherein the common module comprises:
   a synchronization burst generation module configured to generate a synchronization burst of a mode according to a system clock, and the synchronization burst is output to the base-band single-boards through the clock bus.

5. The multi-mode base station according to claim 2, wherein the connection between the common module and the base-band single-boards comprises at least one of the following:
   a chain-type interconnection, wherein the common module is at one end of a chain, and the base-band single-boards are serially-connected on the chain;
   a star-type interconnection, wherein the common module is at a central position, and is connected to each of the base-band single-boards;
   a bus-type interconnection, wherein the common module and each of the base-band single-boards are connected to a same bus respectively;
   a ring-type interconnection, wherein the common module and each of the base-band single-boards are serially-connected on a same ring respectively; and
   an exchange-type interconnection, wherein the common module and each of the base-band single-boards are connected to a same exchange respectively.

6. The multi-mode base station according to claim 1, wherein the mode of a base-band single-board comprises any one of the following modes:
   a global system for mobile communication (GSM) mode, a code division multiple access (CDMA) mode, a worldwide interoperability for microwave access (WiMAX) mode, a wideband code division multiple access (WCDMA) mode, a time division synchronous code division multiple access (TD-SCDMA) mode, a code division multiple access 2000 (CDMA2000) mode, a personal handyphone system (PHS) mode, a cluster mode, a long term evolution (LTE) mode, and an air-interface evolution mode.

7. The multi-mode base station according to claim 1, wherein the IQ data of the M service data mode periods is filled in one basic frame group for transmission according to the following rule:
   each RF unit is assigned with a K-bit bearing space in a load region of every basic frame in the one basic frame group so that K=[M×2×D×S×A×C×F/N], wherein A is a number of antennae in the RF unit, C is a number of carriers in the RF unit, S is an over-sampling multiple of interface IQ data, D is a bit width of the IQ data, F is a number of sectors supported by the RF unit, and "[ ]" indicates a round up operation.

8. The multi-mode base station according to claim 1, wherein the IQ data of the M service data mode periods is filled in one basic frame group for transmission according to the following rule:

when a bearing space assigned in the one basic frame group is greater than a bearing space actually required by the service frame IQ data, a bearing space in a basic frame with a posterior transmission sequence in the one basic frame group is filled preferentially, so that all bearing spaces of basic frames in the one basic frame group at a posterior part of the transmission sequence are filled, and an equal amount of data is filled in a remainder of the basic frames in the one basic frame group.

9. The multi-mode base station according to claim 1, wherein the IQ data of the M service data mode periods is filled in one basic frame group for transmission according to the following rule:
when a bearing space assigned in the one basic frame group is greater than the bearing space actually required by the service frame IQ data, a bearing space in a basic frame with a posterior transmission sequence in the one basic frame group is filled preferentially, so that all bearing spaces of basic frames in the one basic frame group at a posterior part of the transmission sequence are filled, bearing spaces of the basic frames in a related part of the transmission sequence in the basic frame group are not filled, and a one or a zero basic frame in a middle part of the one basic frame group is partially filled with data.

10. The multi-mode base station according to claim 1, wherein the IQ data of the M service data mode periods is filled in one basic frame group for transmission according to the following rule:
when a bearing space assigned in the one basic frame group is greater than the bearing space actually required by the service frame IQ data, a bearing space in a basic frame of a prior transmission sequence in the one basic frame group is filled preferentially, so that all bearing spaces of the basic frames of the prior transmission sequence are filled, and an equal amount of data is filled in a remainder of the basic frames in the one basic frame group.

11. The multi-mode base station according to claim 1, wherein the IQ data of the M service data mode periods is filled in one basic frame group for transmission according to the following rule:
when a bearing space assigned in the one basic frame group is greater than the bearing space actually required by the service frame IQ data, a bearing space in a basic frame of a prior transmission sequence in the one basic frame group is filled preferentially, so that all bearing spaces of the basic frames of the prior transmission sequence are filled, bearing spaces of the basic frames of the posterior part of the transmission sequence in the one basic frame group are not filled, and a one or a zero basic frame in a middle of the one basic frame group is partially filled with data.

12. The multi-mode base station according to claim 1, wherein a base-band single-board is inserted in a random slot.

13. A method for sending signals of a multi-mode base station, comprising:
performing, within the multi-mode base station, by each of at least two base-band single-boards of different modes, base-band processing on downstream data to generate in-phase/quadrature (IQ) data, and outputting the IQ data to an exchange bus configured to connect each of the at least two base-band single-boards of different modes to a corresponding RF unit of the at least one RF unit in a manner compatible with each of the modes, wherein each of the at least two base-band single-boards obtain at least one of a main control signal or transmission from a common module;
transmitting, by the exchange bus, the IQ data from the at least two base-band single-boards to a corresponding radio frequency (RF) unit in a manner compatible with each of a plurality of multi modes for RF processing; and
sending, by the RF unit, the data downwards after RF processing, wherein the exchange bus is compatible with each of the multi modes in the following manner:
the exchange bus carries in-phase/quadrature (IQ) data by using a basic frame group as
unit, each basic frame group comprises N basic frames, and a period of each basic frame group is M times as long as a service data mode period; and a radio equipment fills the IQ data of M service data mode periods in one basic frame group for transmission, wherein N and M are natural numbers.

14. The method according to claim 13, wherein the plurality of base-band single-boards directly or indirectly further obtain a clock signal from the common module; and the at least two of base-band single-boards use at least one of the obtained main control, transmission, and clock to process a base-band signal.

15. The method according to claim 13, wherein the mode of a base-band single-board of the at least two of base-band single-boards comprises any one of the following modes:
a global system for mobile communication (GSM) mode, a code division multiple access (CDMA) mode, a worldwide interoperability for microwave access (WiMAX) mode, a wideband code division multiple access (WCDMA) mode, a time division synchronous code division multiple access (TD-SCDMA) mode, a code division multiple access 2000 (CDMA2000) mode, a personal handyphone system (PHS) mode, a cluster mode, a long term evolution (LTE) mode, and an air-interface evolution mode.

16. A method for receiving signals of a multi-mode base station, comprising:
performing, by a radio frequency (RF) processing unit, RF processing on upstream signals to generate IQ data of different modes, and outputting the IQ data to an exchange bus;
transmitting, by the exchange bus, the IQ data from the RF processing unit to a corresponding base-band single-board of at least two base-band single boards in a manner compatible with each of the different modes;
directly or indirectly obtaining, by the corresponding base-band single-board, a main control signal or transmission from a shared common module; and
performing, by the corresponding base-band single-board, base-band processing on the IQ data with at least one of the obtained a main control signal, and transmission,
wherein the exchange bus is compatible with each of the multi modes in the following manner:
the exchange bus carries in-phase/quadrature (IQ) data by using a basic frame group as
unit, each basic frame group comprises N basic frames, and a period of each basic frame group is M times as long as a service data mode period; and a radio equipment fills the IQ data of M service data mode periods in one basic frame group for transmission, wherein N and M are natural numbers.

17. The method according to claim 16, further comprising:
directly or indirectly obtaining, by the corresponding base-band single-board, a clock signal from a shared common module, and processing base-band signals with the obtained clock signal.

18. The method according to claim 16, wherein the different modes comprises any one of the following modes:

a global system for mobile communication (GSM) mode, a code division multiple access (CDMA) mode, a worldwide interoperability for microwave access (WiMAX) mode, a wideband code division multiple access (WCDMA) mode, a time division synchronous code division multiple access (TD-SCDMA) mode, a code division multiple access 2000 (CDMA2000) mode, a personal handyphone system (PHS) mode, a cluster mode, a long term evolution (LTE) mode, and an air-interface evolution mode.

19. The multi-mode base station according to claim 1, wherein the common module is coupled to the at least two base-band single-boards through a connection different from the exchange bus, wherein the connection comprises a universal control information exchange bus, and wherein the common module and each of the base-band single-boards are directly connected to the universal control information exchange bus.

\* \* \* \* \*